(12) United States Patent
Arita

(10) Patent No.: US 9,664,938 B2
(45) Date of Patent: May 30, 2017

(54) DISPLAY DEVICE

(71) Applicant: MITSUBISHI ELECTRIC CORPORATION, Tokyo (JP)

(72) Inventor: Kenji Arita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/495,044

(22) Filed: Sep. 24, 2014

(65) Prior Publication Data

US 2015/0116609 A1    Apr. 30, 2015

(30) Foreign Application Priority Data

Oct. 29, 2013   (JP) ................................ 2013-224308

(51) Int. Cl.
*G02F 1/1333* (2006.01)
*G06F 1/16* (2006.01)

(52) U.S. Cl.
CPC .... *G02F 1/13338* (2013.01); *G02F 1/133308* (2013.01); *G06F 1/1607* (2013.01); *G02F 2001/133317* (2013.01); *G02F 2001/133322* (2013.01); *G02F 2202/28* (2013.01)

(58) Field of Classification Search
CPC .......... G02F 1/13338; G02F 1/133608; G02F 2001/133317; G02F 2001/133322; G02F 2202/28; G06F 1/1607
USPC .................................................. 361/679.01
See application file for complete search history.

(56) References Cited

U.S. PATENT DOCUMENTS

| | | | |
|---|---|---|---|
| 2009/0011197 A1 | 1/2009 | Matsuhira | |
| 2009/0103000 A1 | 4/2009 | Monden et al. | |
| 2009/0180244 A1* | 7/2009 | Kiyohara | G02F 1/13338 361/679.01 |
| 2010/0302132 A1* | 12/2010 | Ito | G02F 1/133308 345/87 |
| 2011/0012852 A1* | 1/2011 | Takahashi | G02F 1/13338 345/173 |
| 2013/0016311 A1* | 1/2013 | Ishii | G02F 1/133308 349/96 |
| 2013/0258570 A1* | 10/2013 | Nashiki | G06F 3/044 361/679.01 |
| 2014/0078696 A1* | 3/2014 | Matsuda | G06F 3/041 361/752 |
| 2014/0168864 A1* | 6/2014 | Lin | G02F 1/133308 361/679.01 |

FOREIGN PATENT DOCUMENTS

| | | |
|---|---|---|
| JP | 2009-008703 A | 1/2009 |
| JP | 2009-116297 A | 5/2009 |

* cited by examiner

*Primary Examiner* — Donald Raleigh
(74) *Attorney, Agent, or Firm* — Studebaker & Brackett PC

(57) ABSTRACT

A display device of this disclosure: a display element; a first frame holding the display element; a second frame having an opening and engaged with the first frame to arrange therein the display element, and a transparent member arranged on a front surface of the display element with an adhesive material being interposed therebetween. The transparent member is accommodated in an opening without overlapping with the opening of the second frame.

16 Claims, 4 Drawing Sheets

DISPLAY DEVICE

CROSS-REFERENCE TO RELATED APPLICATION

This application claims priority from Japanese Patent Application No. 2013-224308 filed on Oct. 29, 2013, the entire subject matter of which is incorporated herein by reference.

TECHNICAL FIELD

This disclosure relates to a display device having a touch panel and/or a protection member having robustness on a front surface of a display element.

BACKGROUND

In recent years, as information electronic devices are spread, a display device having a touch panel and/or a protection member having robustness on a front surface of a display element is widely spread. The display device and the touch panel and/or the display device and the protection member are bonded therebetween by an adhesive material having the substantially equal refractive index thereto. Thereby, surface reflection between the respective members is removed, deterioration of the visibility due to the surface reflection of the outside light is suppressed or the display device is protected from an external shock, water immersion or dust.

When the touch panel and/or the protection member are arranged on the front surface of the display element, in order to suppress air bubbles from being generated upon adhesion of the adhesive material, a thick adhesive material capable of absorbing a step or a plurality of sheets of adhesive materials with being overlapped is used in the vicinity of a step between a frame holding a peripheral part of the display element and a display surface of the display element (for example, refer to 2009-8703A or 2009-116297A).

By the way, when attaching the display device disclosed in 2009-8703A or 2009-116297A to an outer housing, following problems are considered. The display device of the background art is described with reference to the drawings. FIG. 6 is a sectional view of the display device of the background art, and FIG. 7 is an enlarged view of an A part of FIG. 6. As shown in FIGS. 6 and 7, a display device 200 is shown which includes at least a backlight 201, a front frame 207 holding a display element 202 arranged at a position facing the backlight 201, a touch panel 205 held at a display surface-side of the display element 202 by first and/or second adhesive materials 211, 212 and a protection member 206 held by a third adhesive material 213 arranged on an upper surface of the touch panel 205. When attaching the display device 200 from a side surface to an outer housing 203 by a screw 204, the front frame 207 is deformed in an inside direction (a direction along which the front frame 207 presses the display device 200) of the display device 200, as shown with a first deformation direction 2071. Also, an upper surface of the front frame 207 is tensioned in a direction getting away from the display device 200 by a reaction, as shown with a second deformation direction 2072. Thereby, the second adhesive material 212 is applied with a peeling force, so that air bubbles 2020 may be generated in the first adhesive material 211 and the second adhesive material 212 in the vicinity of an opening end portion of the front frame 207. Also, a force is applied from the outer housing 203 at the display surface-side in a housing weighting direction 2031, so that the display element 202 is pressed in the vicinity of the opening end portion of the front frame 207 to thus cause display unevenness 2021.

SUMMARY

This disclosure is to suppress an air bubble, which is generated in an adhesive material arranged at an opening end portion of a front frame having a display element arranged therein, and display unevenness, which is generated in the display element, when attaching a display device to an outer housing.

A display device of this disclosure comprises: a display element; a first frame holding the display element; a second frame having an opening and engaged with the first frame to arrange therein the display element, and a transparent member arranged on a front surface of the display element with an adhesive material being interposed therebetween. The transparent member is accommodated in an opening without overlapping with the opening of the second frame.

According to the display device of this disclosure, it is possible to suppress an air bubble, which is generated in the adhesive material arranged at the opening end portion of the second frame engaged with the first frame to arrange therein the display element, and display unevenness, which is generated in the display element, when attaching the display device to an outer housing.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Figure 1:
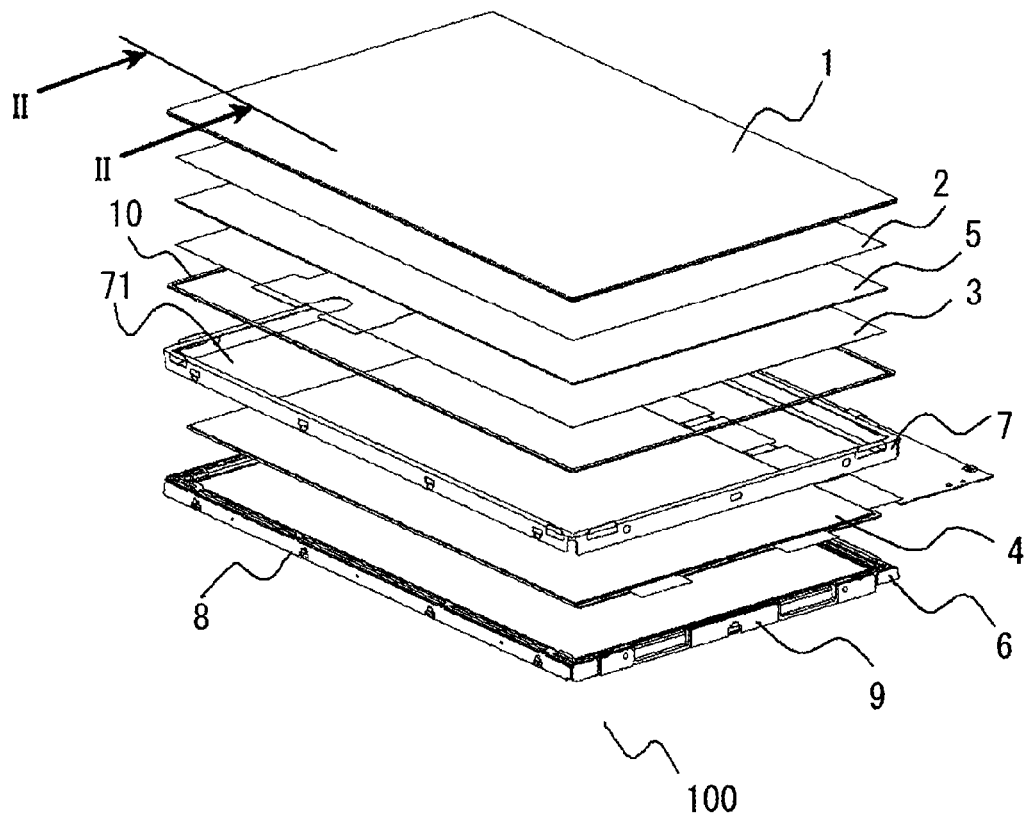
FIG. 1 is an exploded perspective view of a display device according to an illustrative embodiment of this disclosure.

Hereinafter, an illustrative embodiment of this disclosure will be described with reference to the drawings. FIG. 1 is an exploded perspective view of a display device according to an illustrative embodiment of this disclosure, and FIG. 2 is a sectional view in II-II line at a state where the display device of FIG. 1 is assembled.

Figure 2:
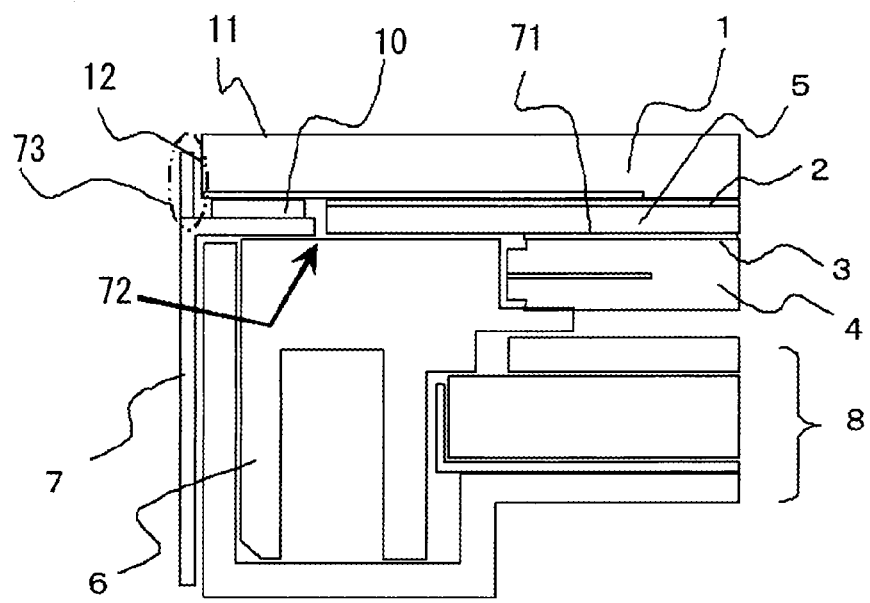
FIG. 2 is a sectional view at II-II line in a state where the display device of FIG. 1 is assembled.

As shown in FIGS. 1 and 2, a display device 100 of this disclosure has a display element 4 displaying an image, a backlight 8 illuminating the display element 4 and a transparent member arranged on a display surface of the display element 4. The transparent member is a touch panel 5 converting information about position coordinates input from an outside (an operator) into an electrical signal, a protection member 1 for protecting the display element 4 or touch panel 5, and the like. Also, each member has a mold frame 6, which is a first frame configuring the backlight 8, and an opening 71 and is held at a front frame 7, which is a second frame engaged with the mold frame 6 to thus hold each member. The protection member 1 and the touch panel 5 are adhered by a first adhesive material 2 therebetween, and the touch panel 5 and the display element 4 are adhered by a second adhesive material 3 therebetween. Also, the front frame 7 and the protection member 1 are fixed and integrated by a bonding member 10, which is adhered to an outer periphery (an upper surface) of the front frame 7 at a display surface-side. In the meantime, the touch panel 5 and the display element 4 are held by the mold frame 6 configuring the backlight 8 and a rear frame 9 (which is a third frame).

<Display Element>

As the display element 4, a plasma display panel, a liquid crystal panel and the like may be used. The liquid crystal panel uses the birefringence of liquid crystals and has a first substrate having a coloring layer, a light shield layer, a counter electrode and the like formed on an insulating substrate such as glass and a second substrate having a thin film transistor (hereinafter, referred to as TFT) functioning as a switching element, a pixel electrode and the like formed on an insulating substrate such as glass. Also, the liquid crystal panel has a spacer for maintaining an interval between the first substrate and the second substrate, a seal material for bonding the counter substrate and the TFT array substrate, liquid crystals sandwiched between the counter substrate and the TFT array substrate, a sealant of an injection port for injecting the liquid crystals, an orientation film for aligning the liquid crystals, a polarization plate and the like, which are not shown.

<Backlight>

The backlight 8 has at least a light source of emitting light and the mold frame 6 for holding a light guide plate propagating the light emitted from the light source, and the like, and illuminates the display element 4. In the display device 100 of this illustrative embodiment, the display element 4 is illuminated from a rear surface-side, which is opposite to the display surface, by the backlight 8.

<Touch Panel>

The touch panel 5 converts the information about the position coordinates, which are input from the outside (the operator), into the electrical signal by a circuit of transparent electrodes formed on the transparent substrate and transmits the same to a control circuit of a final product by an output wiring member, which is not shown. Meanwhile, in this illustrative embodiment, a projection capacity type is used as the touch panel 5. In the touch panel 5 of the projection capacity type, a position of a finger tip of an operator, for example, is detected with coordinate data, a ratio of current amounts by a plurality of electrode patterns of a contact position and the vicinity thereof is measured to precisely determine the position of the finger and a signal is thus input. Also, transparent glasses and the like are used as upper and lower substrates configuring the touch panel 5.

<Protection Member>

The protection member 1 is arranged on the upper surface of the touch panel 5 or display element 4 so as to suppress the touch panel 5 and display element 4 from being damaged, deformed, worn, dirtied and the like due to the pressurization or contact from the outside, and is configured by a substantially transparent material such as glass, plastic and the like. In this illustrative embodiment, the glass that has high strength and is difficult to be deformed is used as the protection member 1. Also, a thickness of the protection member is thicker than the touch panel 5. When the thickness of the protection member is substantially twice as thick as the touch panel 5, the deformation or damage thereof can be avoided. Also, it is possible to add a function of a design member by performing a printing or painting on a surface or backside of the protection member 1.

<Front Frame>

The front frame 7 is a member for holding the display element 4, the backlight 8, the touch panel 5, the protection member 1 and the like and is configured by a thin metal plate or resin-molded member. The front frame 7 may be integrally configured or may be configured by combining a plurality of members. Also, the front frame 7 can be attached to an outer housing (not shown) through an attaching part (a screw part, an attaching hole and the like) formed on a side surface thereof.

<Adhesive Material>

The first and second adhesive materials 2, 3 are used to bond the display element 4 and the touch panel 5 (the transparent member) and/or the protection member 1. The first and second adhesive materials 2, 3 have the substantially equal refractive indexes as the display element 4 and the transparent member, bond the respective members therebetween and remove surface reflections between the respective members to thus suppress the visibility from being deteriorated due to the surface reflection of the outer light. Also, the first and second adhesive materials protect the display device 100 from the external shock, water immersion, dust and the like. The first and second adhesive materials 2, 3 may be bonded by a material in a sheet shape. Alternatively, the first and second adhesive materials having flowability may be cured and bonded by UV or heat.

<Bonding Member>

The bonding member 10 is a double-sided tape or adhesive material and has cushioning characteristics. The bonding member may have a structure where a double-sided tape or adhesive is arranged on a buffer member having cushioning characteristics. When a curable resin and the like are used, it is possible to further improve the adhesiveness because the adhesive force becomes stronger over time. The bonding member 10 may be used between the front frame 7 and the protection member 1, between the display element 4 and the backlight 8 or both of them.

As shown in FIG. 2, according to the display device 100 of this disclosure, an opening end portion 72 of the front frame 7 is formed to be larger than an outer shape of the touch panel 5 arranged on the display surface-side of the display element 4 (enlarged more outwards than an outer shape of the touch panel 5). The touch panel 5 is accommodated in an opening 71 without overlapping with the opening end portion 72 of the front frame 7. Thereby, the front frame 7 does not interfere with the touch panel 5 and the display element 4. In the meantime, the touch panel 5 and the display element 4 are held by the mold frame 6 configuring the backlight 8.

As described above, when attaching the display device 100 to the outer housing, the front frame 7 is applied with stress, so that air bubbles are generated in the first and second adhesive materials 2, 3 arranged at the opening end portion 72 of the front frame 7 and the display unevenness is caused in the display element 4. However, according to the display device of this illustrative embodiment, the touch panel 5 is accommodated in the opening 71 without overlapping with the opening end portion 72 of the front frame 7. Therefore, it is possible to suppress the opening end portion 72 of the front frame 7 from interfering with the display element 4. Also, the force that is applied to the front frame 7 when attaching the display device 100 to the outer housing and the like is difficult to be transmitted to the first adhesive material 2, the second adhesive material 3 or the display element 4. Therefore, since the peeling force is difficult to be applied to the first adhesive material 2 and the second adhesive material 3, it is possible to suppress the air bubbles from being generated in the adhesive materials and to suppress the display unevenness from being caused in the display element 4, as compared to the structure of the background art.

Further, a plurality of sheets of the adhesive materials, which are arranged so as to remove the step (an air layer) of the opening 71 of the front frame 7 in the structure of the background art, can be omitted, so that it is possible to reduce a total thickness of the display device.

Figure 6:
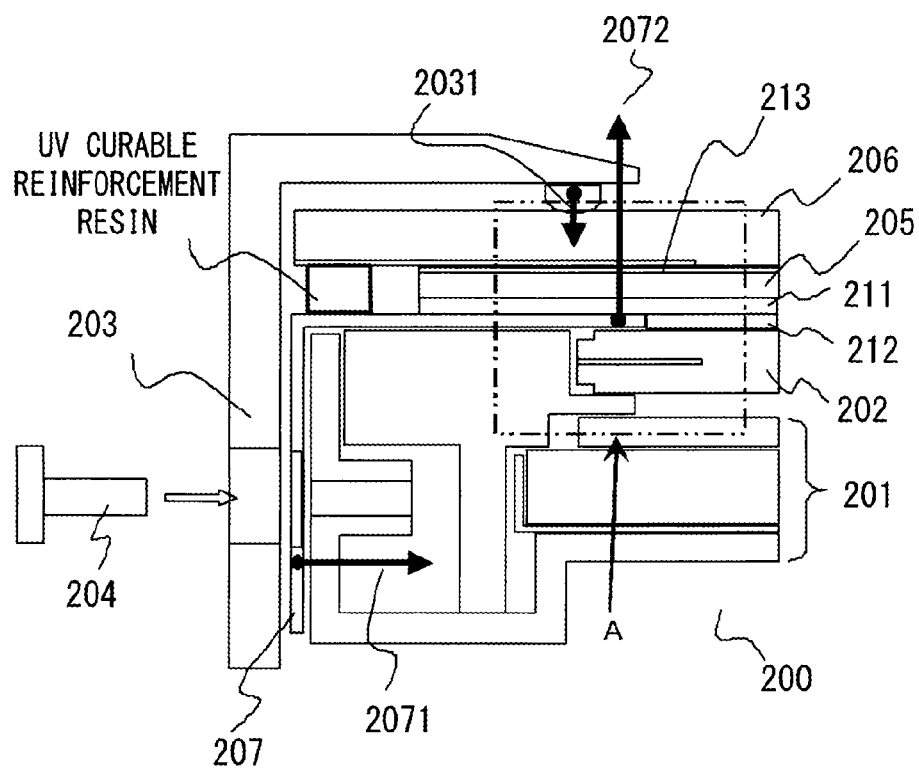
FIG. 6 is a sectional view of a display device of the background art.
Figure 7:
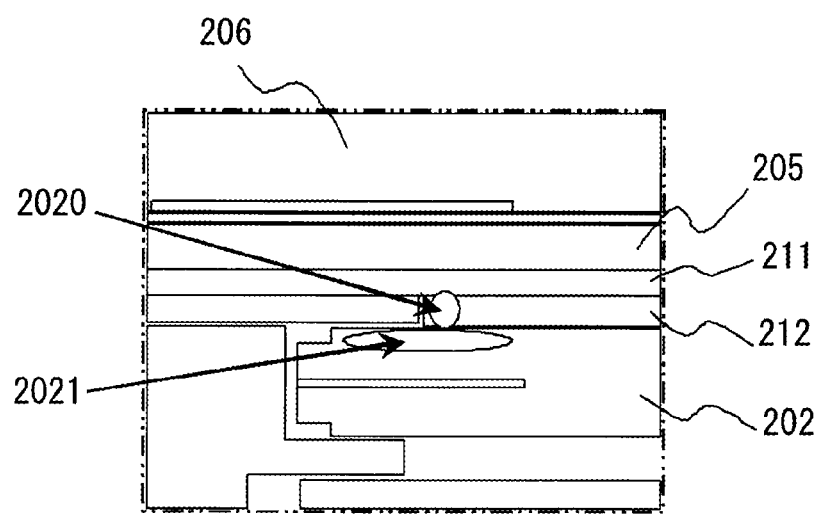
FIG. 7 is an enlarged view of an A part of FIG. 6.

Also, when the display device 100 having the touch panel 5 or protection member 1 arranged on the display surface of the display element 4, like this disclosure, is used in a vertical state, the protection member 1 may deviate due to the own weight thereof. As shown in FIG. 2, according to that protrusions 73 are integrally provided at positions corresponding to the side portions 12 of the protection member 1 of the front frame 7, it is possible to control the deviation of the protection member 1 due to the own weight. A height of the protrusion 73 of the front frame is formed to be lower than a summed height of the protection member 1 and the bonding member 10 in a thickness direction, i.e., a height of the upper surface 11 of the protection member 1. Thereby, when an outer housing 202 is arranged (refer to FIGS. 6 and 7), it is possible to suppress the protrusion 73 from interfering with the outer housing 203.

Figure 3:
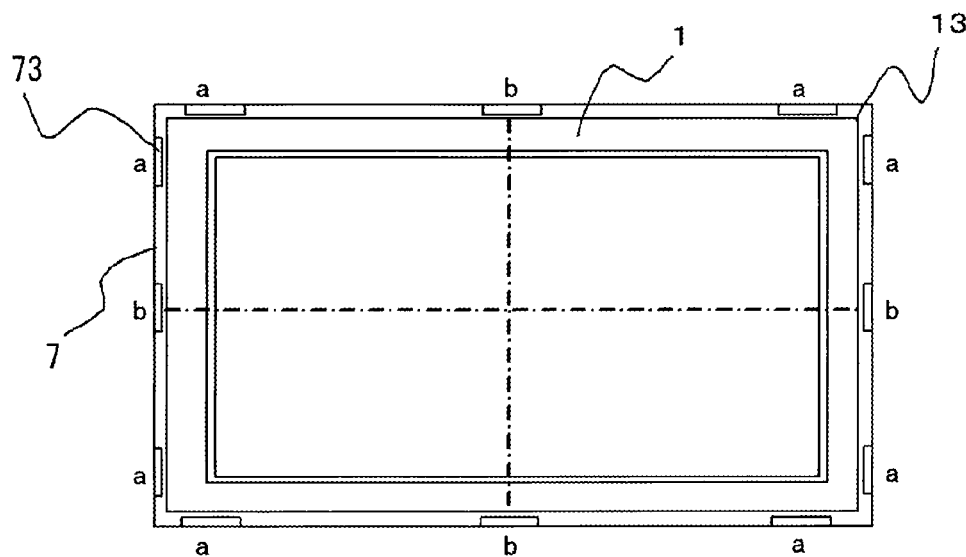
FIG. 3 is a plan view of the display device.

Also, as shown in FIG. 3, the protrusions 73 are arranged at 'a' portions (preferably, eight portions) corresponding to the side portions 12 of the protection member 1 and corresponding to the side portions 12 close to four corner parts 13. When a thickness of the protection member 1 is increased, for example, and the sufficient strength is not thus secured only with the 'a' portions, the protrusions 73 are also formed at 'b' portions, in addition to the vicinities ('a' portions) of the four corner parts 13. Thereby, it is possible to further suppress the protection member 1 from deviating. Also, in the structure of the background art, when attaching the protection member 1, a jig for attaching the same at a determined position is required. However, the front frame 7 is provided with the protrusions 73. Therefore, when the protection member 1 is adhered in conformity to the protrusions 73 of the front frame 7, it is possible to easily perform the positioning operation of the protection member 1. That is, the jig for attachment is not required. Also, the front frame 7 may be formed of a material including metal and the protrusion 73 may be formed by bending processing. It is possible to easily form the protrusions 73 by the bending processing.

Figure 4:
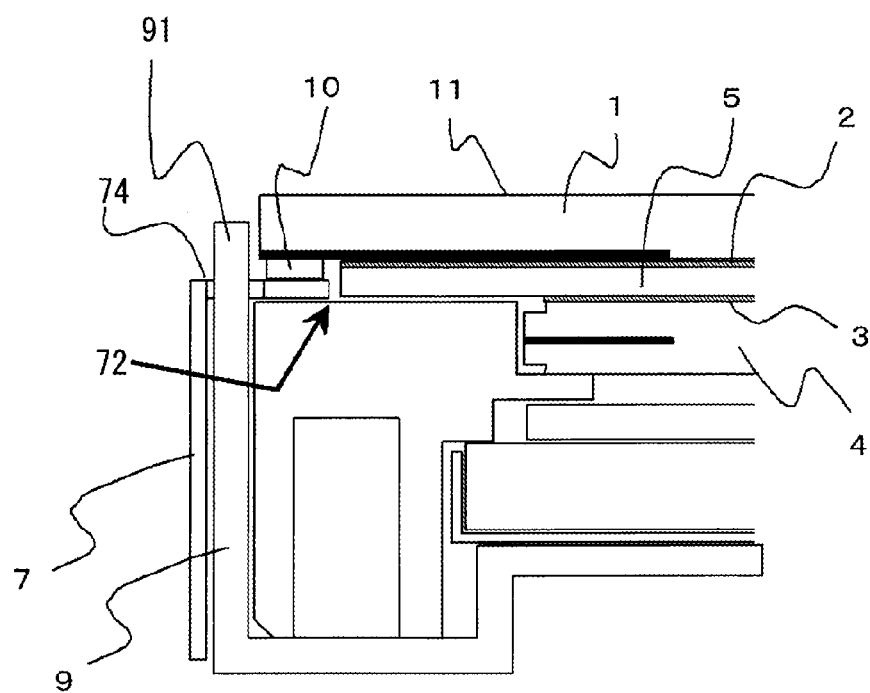
FIG. 4 is a sectional view of a display device according to a modified embodiment of this disclosure.

FIG. 4 illustrates a modified embodiment of the display device of this disclosure. In the above configuration, the front frame 7 is provided with the protrusions 73 so as to suppress the deviation of the protection member 1, thereby regulating the deviation of the protection member 1. However, as shown in FIG. 4, when the rear frame 9 is provided with a protrusion 91 at a position facing the side portion 12 of the protection member 1 and the protrusion 91 is enabled to pass through an opening hole 74 formed at the upper surface-side of the front frame 7, it is possible to realize the same effect.

Figure 5:
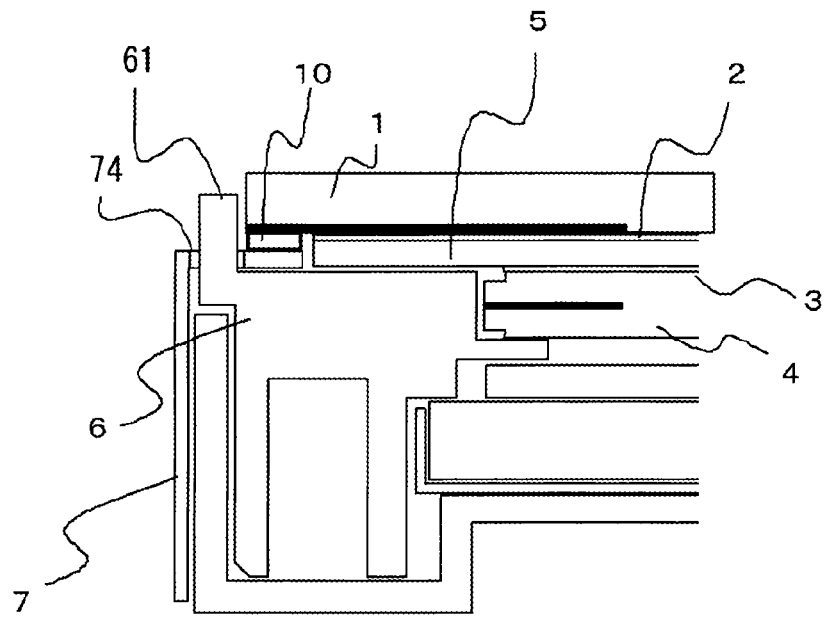
FIG. 5 is a sectional view of a display device according to a modified embodiment of this disclosure.

FIG. 5 illustrates another modified embodiment. As shown in FIG. 5, when the upper part of the front frame 7 is formed with the opening hole 74 and the mold frame 6 is formed with a standing protrusion 61 at a position facing the side portion 12 of the protection member 1, it is possible to realize the same effect.

What is claimed is:

1. A display device comprising:
a display element;
a first frame comprising an overhang which separates a backlight from the display element;
a second frame having an opening and engaged with the first frame to arrange therein the display element; and
a transparent member arranged on a front surface of the display element,
wherein the transparent member is accommodated in the opening and arranged without overlapping the second frame in a plan view, and
wherein the display element is arranged without overlapping the second frame in a plan view.

2. A display device comprising:
a display element;
a first frame holding the display element;
a second frame having an opening and engaged with the first frame to arrange therein the display element; and
a transparent member arranged on a front surface of the display element,
wherein the transparent member is accommodated in the opening and arranged without overlapping the second frame in a plan view,
wherein the transparent member is a touch panel,
wherein the display device further comprises a protection member that is arranged on a front surface of the touch panel with an adhesive material being interposed therebetween,
wherein the second frame has an upper face and a protrusion, which protrudes in a direction parallel with a thickness direction of the protection member, wherein a front end face of the upper face configures the opening end portion and faces a side of the touch panel,
wherein a height of the protrusion is smaller than a summed height of the protection member and a bonding member, and
wherein the first frame comprises an overhang which separates a backlight from the display element.

3. The display device according to claim 2,
wherein the protection member is rectangular, and
wherein the protrusion is arranged at least in the vicinity of a corner part of the protection member.

4. The display device according to claim 2,
wherein the second frame is formed of a material including metal and the protrusion is formed by bending processing.

5. The display device according to claim 1,
wherein the transparent member is a touch panel,
wherein the display device further comprises a protection member that is arranged on a front surface of the touch panel with an adhesive material being interposed therebetween,
wherein the first frame has a protrusion that is formed at a position facing a side of the protection member, and
wherein the protrusion passes through an opening hole formed at an upper surface-side of the second frame.

6. The display device according to claim 1,
wherein the transparent member is a touch panel,
wherein the display device further comprises:
a protection member that is arranged on a front surface of the touch panel with an adhesive material being interposed therebetween;
a backlight illuminating the display element; and
a third frame holding the backlight and engaged with the first or second frame, wherein the third frame has a protrusion that is formed at a position facing a side of the protection member, and wherein the protrusion passes through an opening hole formed at an upper surface-side of the second frame.

7. A display device comprising:
a display element;
a first frame holding the display element;
a protection member;
a second frame, which has an upper face having an opening and is engaged with the first frame to arrange therein the display element; and
a transparent member arranged on a front surface of the display element,
wherein the transparent member is accommodated in the opening of the upper face and arranged without overlapping the upper face of the second frame in a plan view, and
wherein the protection member is fixed on the upper face of the second frame with a bonding member being interposed therebetween.

8. The display device according to claim 7, wherein the display element is arranged without overlapping the upper face of the second frame in a plan view.

9. The display device according to claim 1, wherein the transparent member is arranged on a front surface of the display element with an adhesive material being interposed therebetween.

10. The display device according to claim 2, wherein the transparent member is arranged on a front surface of the display element with an adhesive material being interposed therebetween.

11. The display device according to claim 7, wherein the transparent member is arranged on a front surface of the display element with an adhesive material being interposed therebetween.

12. The display device according to claim 7, wherein the transparent member is a touch panel,
wherein the display device further comprises a protection member that is arranged on a front surface of the touch panel with an adhesive material being interposed therebetween, wherein the second frame has a protrusion, which faces a side of the protection member and protrudes in a direction parallel with the side, and wherein the protrusion is formed to be lower than a height of an upper surface of the protection member.

13. The display device according to claim 7,
wherein the protection member is rectangular, and
wherein the protrusion is arranged at least in the vicinity of a corner part of the protection member.

14. The display device according to claim 7,
wherein the second frame is formed of a material including metal and the protrusion is formed by bending processing.

15. The display device according to claim 7,
wherein the transparent member is a touch panel,
wherein the display device further comprises a protection member that is arranged on a front surface of the touch panel with an adhesive material being interposed therebetween,
wherein the first frame has a protrusion that is formed at a position facing a side of the protection member, and
wherein the protrusion passes through an opening hole formed at an upper surface-side of the second frame.

16. The display device according to claim 7,
wherein the transparent member is a touch panel,
wherein the display device further comprises:
a protection member that is arranged on a front surface of the touch panel with an adhesive material being interposed therebetween;
a backlight illuminating the display element; and
a third frame holding the backlight and engaged with the first or second frame,
wherein the third frame has a protrusion that is formed at a position facing a side of the protection member, and
wherein the protrusion passes through an opening hole formed at an upper surface-side of the second frame.

* * * * *